US008563908B1

(12) United States Patent
Lew et al.

(10) Patent No.: US 8,563,908 B1
(45) Date of Patent: Oct. 22, 2013

(54) METHODS AND SYSTEMS FOR THREAT ENGAGEMENT MANAGEMENT

(75) Inventors: Carissa E. Lew, Sunnyvale, CA (US);
Moses W. Chan, San Carlos, CA (US);
Paul-Andre Monney, Ely, IA (US);
Paul M. Romberg, San Jose, CA (US);
Leo J. Laux, Half Moon Bay, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1169 days.

(21) Appl. No.: 12/340,495

(22) Filed: Dec. 19, 2008

(51) Int. Cl.
*G06F 17/10* (2006.01)
*F41G 7/20* (2006.01)
*F41G 9/00* (2006.01)
*G06F 17/00* (2006.01)
*F41G 7/00* (2006.01)

(52) U.S. Cl.
USPC .......... 244/3.1; 244/3.11; 244/3.15; 89/1.11; 702/127; 702/150; 702/152

(58) Field of Classification Search
USPC ................... 89/1.11, 1.1; 244/3.1, 3.11–3.19; 342/13, 14, 16, 20, 59, 89, 90, 175, 342/195, 52–55, 73, 94, 95, 74–81; 705/1.1; 702/127, 150, 152
See application file for complete search history.

(56) References Cited

U.S. PATENT DOCUMENTS

| | | | | | |
|---|---|---|---|---|---|
| 2,857,592 | A | * | 10/1958 | Hoffman | 342/59 |
| 3,161,870 | A | * | 12/1964 | Pincoffs | 342/59 |
| 5,239,474 | A | * | 8/1993 | Eaton et al. | 702/152 |
| 5,635,662 | A | * | 6/1997 | Robertson et al. | 89/1.11 |
| 6,552,679 | B2 | * | 4/2003 | Sassman et al. | 342/90 |
| 6,839,662 | B2 | * | 1/2005 | Schnatterly et al. | 89/1.11 |
| 6,952,001 | B2 | * | 10/2005 | McKendree et al. | 244/3.1 |
| 7,026,979 | B2 | * | 4/2006 | Khosla | 342/90 |
| 7,081,849 | B2 | * | 7/2006 | Collins et al. | 342/90 |
| 7,148,835 | B1 | * | 12/2006 | Bricker et al. | 342/20 |
| 7,167,127 | B2 | * | 1/2007 | Collins et al. | 342/195 |
| 7,411,543 | B1 | * | 8/2008 | Boka | 342/90 |
| 7,551,121 | B1 | * | 6/2009 | O'Connell et al. | 342/54 |
| 7,626,535 | B2 | * | 12/2009 | Ding et al. | 342/95 |
| 7,757,595 | B2 | * | 7/2010 | Khosla et al. | 89/1.11 |
| 2004/0007121 | A1 | * | 1/2004 | Graves et al. | 89/1.11 |
| 2006/0238403 | A1 | * | 10/2006 | Golan et al. | 342/59 |
| 2008/0109470 | A1 | * | 5/2008 | McGee | 707/102 |
| 2008/0169968 | A1 | * | 7/2008 | Easthope et al. | 342/95 |

OTHER PUBLICATIONS

Moses Chan, et al., "A Java Implementation of the Probabilistic Argumentation System for Data Fusion in Missile Defense Applications", International Symposium on Defense and Security, Proceedings of SPIE, vol. 5434, pp. 176-186, Orlando, FL, USA, 2004.
Paul-Andre Monney, et al., "Modeling Dependence in Dempster-Shafer Theory", International Journal of Uncertainty, Fuzziness and Knowledge-Based Systems, vol. 15-1, pp. 93-114, 2007.

* cited by examiner

*Primary Examiner* — Bernarr Gregory
(74) *Attorney, Agent, or Firm* — McDermott Will & Emery LLP

(57) ABSTRACT

Sensor(s) may be used to detect threat data. A processing system and/or a method may be used to fuse the detected threat data over time. Threat data may comprise information on a munition, missile, rocket, or nuclear/biological/chemical (NBC) projectile or delivery system. Detected threat data may be processed to create a target track-lethality list comprising the locations of any target(s) and a ranking of their lethality in comparison to decoys or chaff. The target track-lethality list may be used to create a target engagement-track list that matches available threat elimination resources (e.g. interceptors) to targets with a weapon-to-target assignment module.

22 Claims, 12 Drawing Sheets

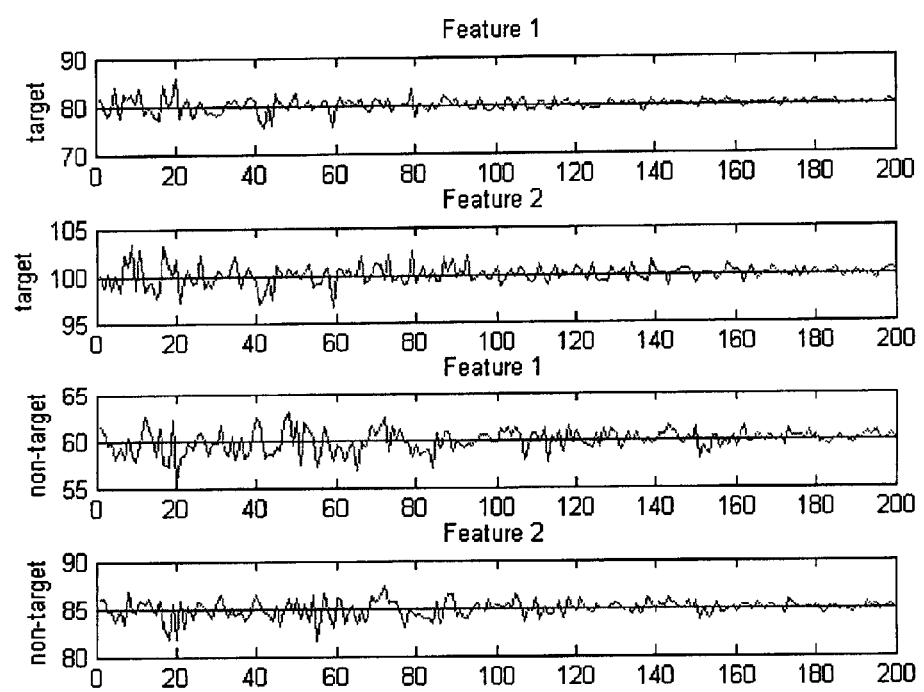
Figure 6a Features with Noise

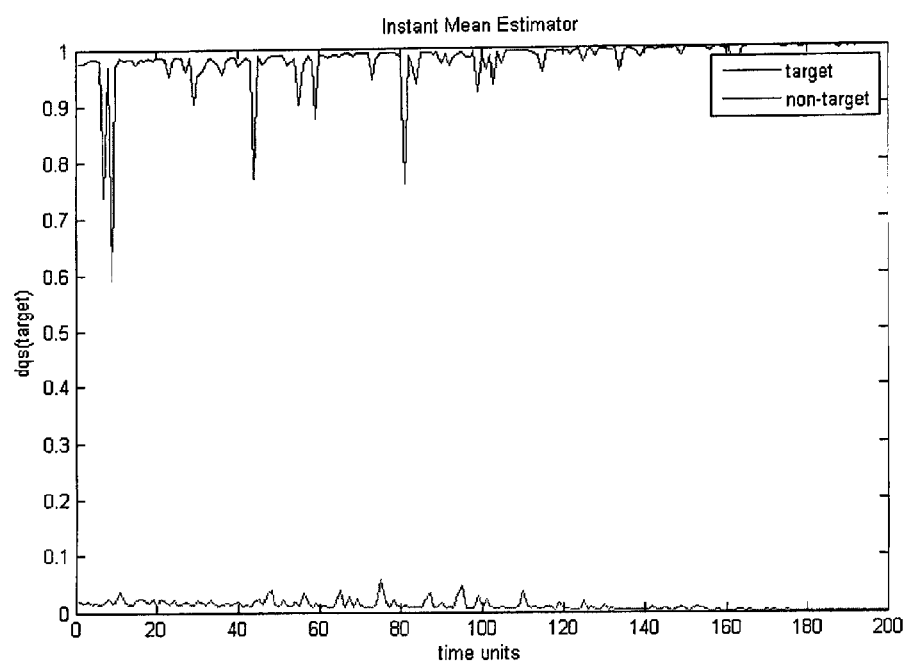
Figure 6b  Fusion with Instant Method

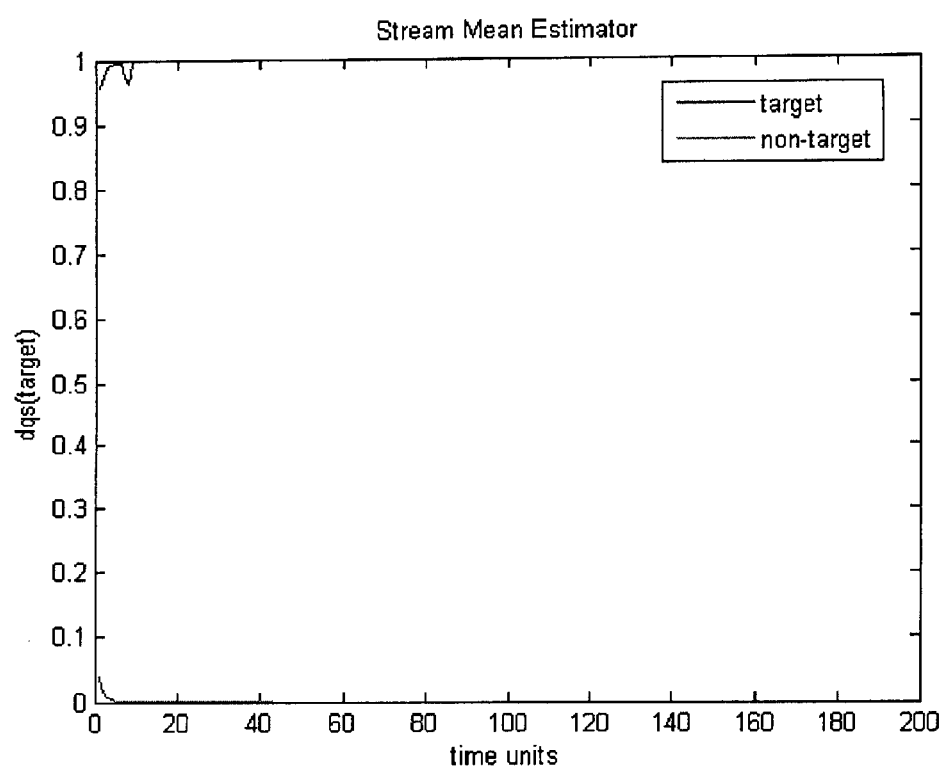
Figure 6c Fusion with Stream Method

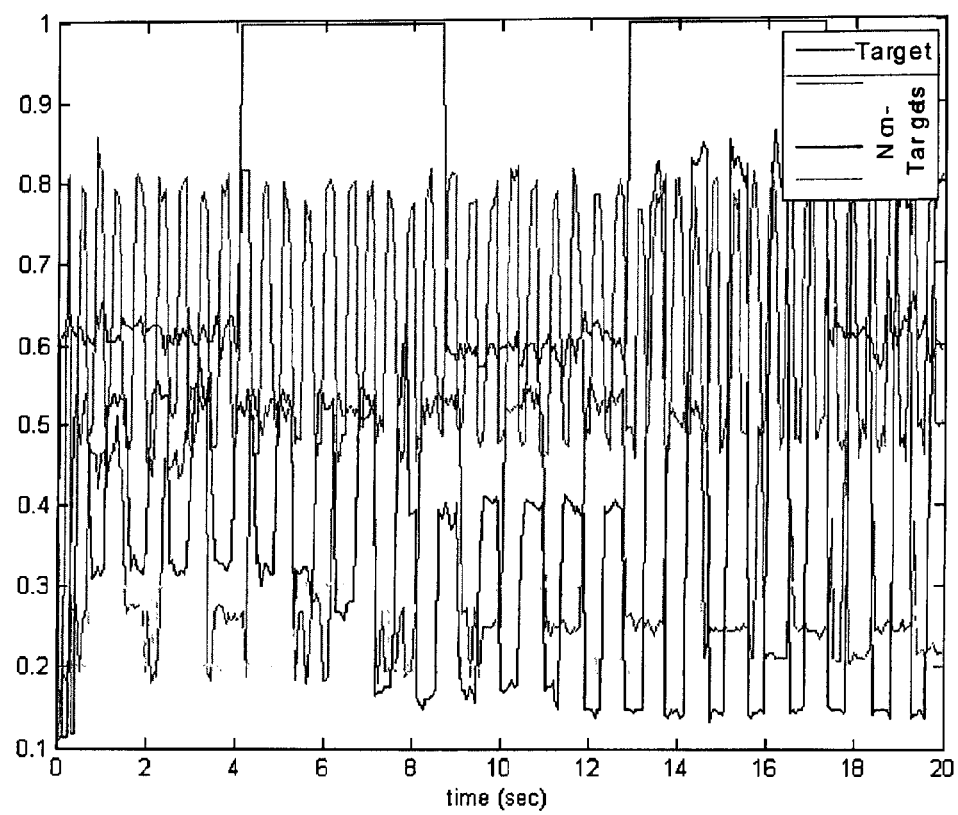
Figure 7a Original Signal

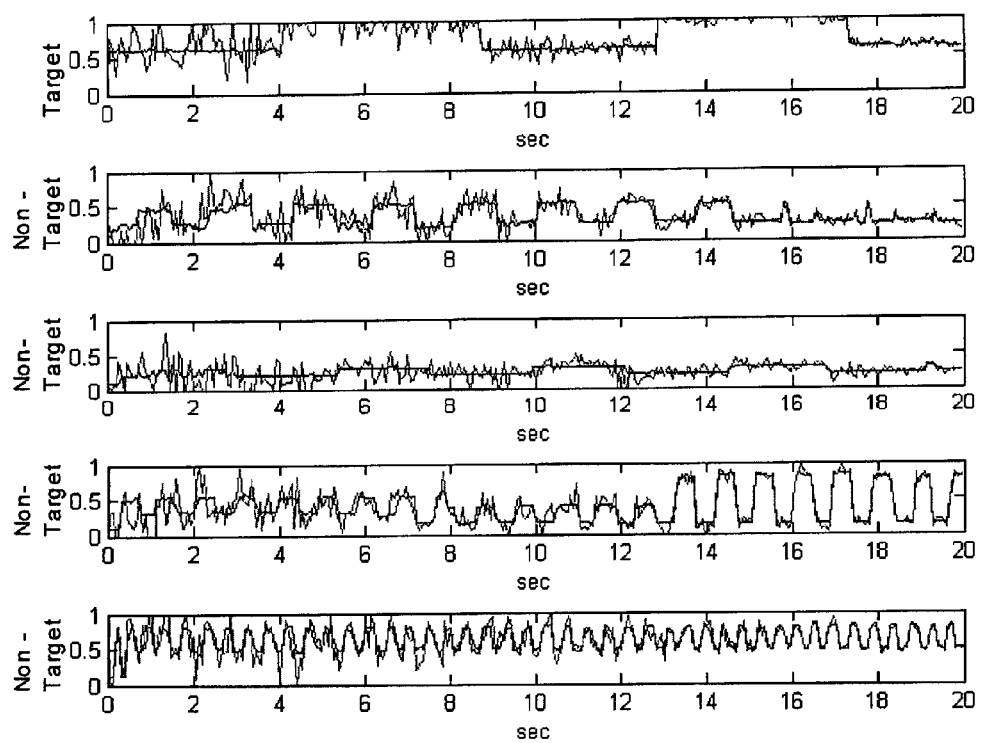
Figure 7b Signal with Noise

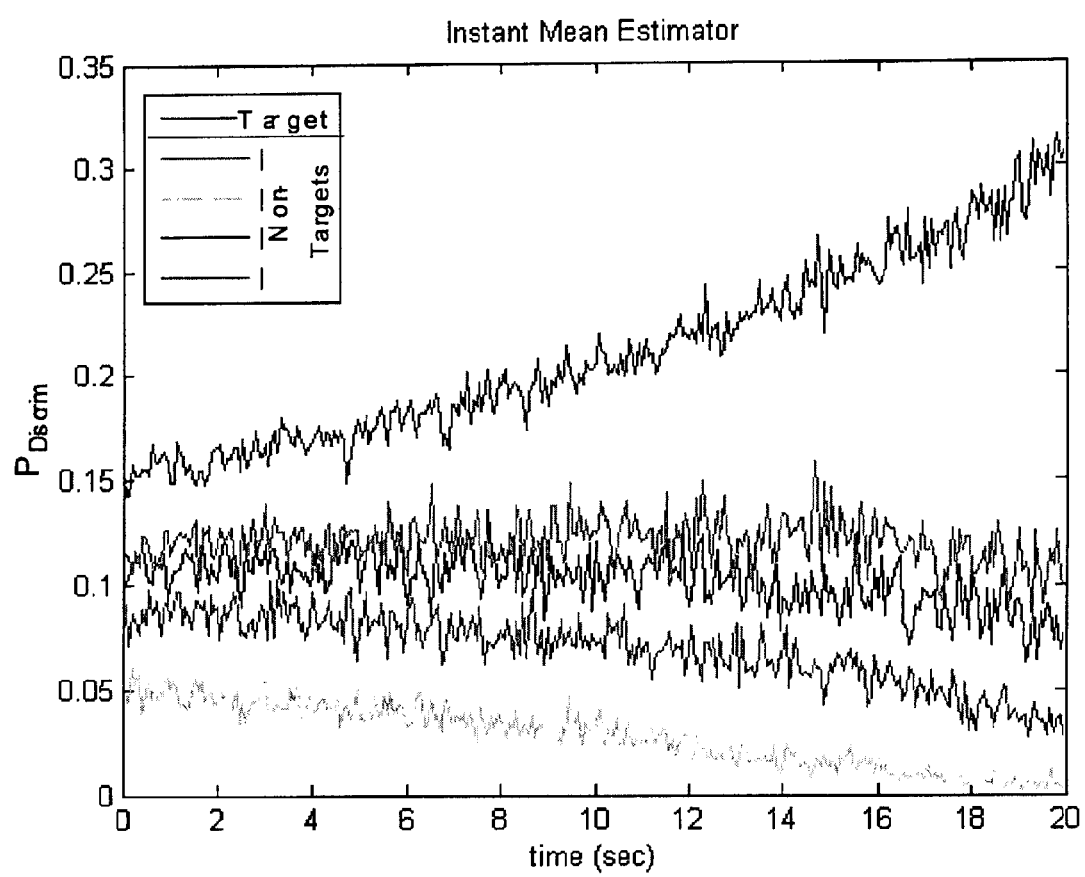
Figure 7c Fusion with Instant Method

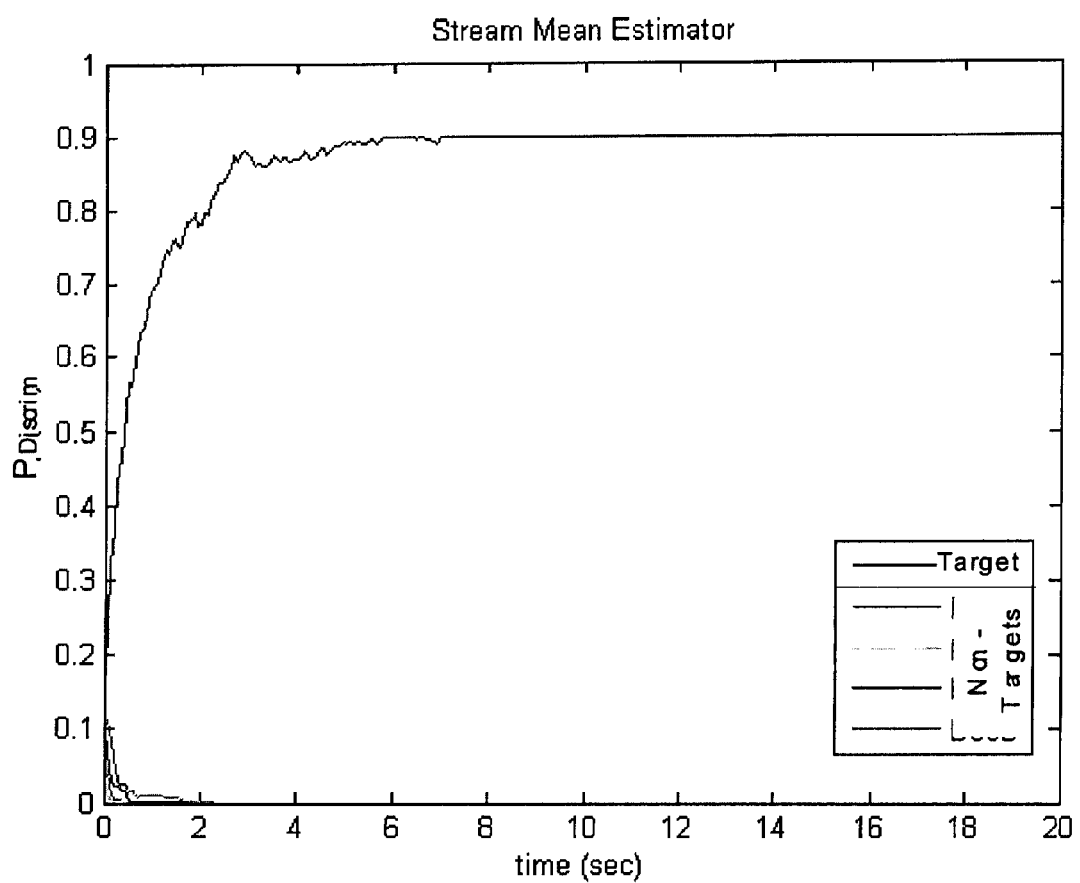
Figure 7d Fusion with Stream Method

METHODS AND SYSTEMS FOR THREAT ENGAGEMENT MANAGEMENT

FIELD

The present invention generally relates to data fusion and, in particular, relates to methods and systems for threat engagement management.

BACKGROUND

A central problem of multi-sensor data fusion is to correctly combine information in the presence of imprecise, uncertain, and even incorrect data. This problem is more serious in instances where potential lives or valuable property are at stake, such as during covert and/or military operations. Typically, data taken from subsequent time instances using multiple sensors is presupposed to be independent and identically distributed (IID). The treatment of data as IID does little to account for imprecise, uncertain, or incorrect data.

SUMMARY

According to various aspects, the present invention provides systems and methods for threat engagement management using data fusion of detected data as a function of time. Sensor(s) are used to detect threat data, and the threat data is fused over time. Threat data may comprise information on a munition, missile, rocket, or nuclear/biological/chemical (NBC) projectile or delivery system. The threat data may be processed to create a target track-lethality list comprising the locations of any target(s) and a ranking of their expected lethality in comparison to decoys or chaff. The target track-lethality list may be used to create a target engagement-track list that matches available threat elimination resources to targets with a weapon-to-target assignment module.

As used herein, data fusion may refer to "aggregating data," or an "aggregation of data," and may apply to a data stream, or data with at least two data points obtained at different points in time. Such a data stream may be found when an attack aircraft releases a missile with an automatic guidance system to engage a target. Measurements may be taken as the missile approaches the target, and the signal-to-noise ratio (SNR) and spatial resolution of the measurements increase as a function of time. Another example of such a data stream might include a missile defense interceptor that is tasked to destroy a warhead. An interceptor may refer to any generalized object that may be used to intercept an enemy or an enemy attack. By way of example and not limitation, an interceptor may comprise a missile, a rocket, motorized machine guns, motorized grenade launchers, motorized mortars, a kill vehicle with a controller and a machine-readable medium that communicates with a carrier vehicle, or another weapon delivery device. When an interceptor is tasked to destroy a warhead, the interceptor collects measurements as it approaches the warhead. Again, the precision of the measurements tend to improve monotonically as a function of time. In these instances, the data contains aspects of time dependency. For example, measurements collected at the present time may contain redundant information when compared to previous measurements. The subject technology utilizes knowledge of these redundancies using a data fusion process, such that decisions about target identity can be computed in less time.

In accordance with an embodiment, a method is provided for target engagement management and includes acquiring threat data at different points in time from an area of interest with multiple sensors, correlating the threat data from the multiple sensors, aggregating the correlated threat data based on at least two data points of the correlated threat data acquired at different points in time, creating a target track-lethality list from the aggregated threat data, and creating a target engagement track list based at least in part on the target track-lethality list.

In accordance with an embodiment, a machine-readable medium encoded with instructions is provided for target engagement management. The instructions provide for acquiring threat data at different points in time from an area of interest with multiple sensors, correlating the threat data from the multiple sensors, aggregating the correlated threat data based on at least two data points of the correlated threat data obtained at different points in time, creating a target track-lethality list from the aggregated threat data, and creating a target engagement track list based at least in part on the target track-lethality list.

In accordance with an embodiment, a processing system is provided for target engagement management. The processing system includes a threat data acquisition module configured to acquire threat data at different points in time from an area of interest with multiple sensors, a correlator configured to correlate the threat data from the multiple sensors, an aggregation module configured to aggregate the correlated threat data based on at least two data points of the correlated threat data obtained at different points in time, and a controller configured to create a target track-lethality list from the aggregated threat data, and to create a target engagement track list based at least in part on the target track-lethality list.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate aspects of the invention and together with the description serve to explain the principles of the invention.

FIG. 6a is a graph of feature data from a simulation using a method or operations for threat engagement management in accordance with an aspect of the present invention.

FIG. 6b is a graph of fusion data using an instant method or operation from a simulation for threat engagement management in accordance with an aspect of the present invention.

FIG. 6c is a graph of fusion data using a stream method or operation from a simulation for threat engagement management in accordance with an aspect of the present invention.

FIG. 7a is a graph of feature data from a simulation using a method or operations for threat engagement management in accordance with an aspect of the present invention.

FIG. 7b is a graph of feature data with noise from a simulation using a method or operations for threat engagement management in accordance with an aspect of the present invention.

FIG. 7c is a graph of fusion data using an instant method or operation from a simulation for threat engagement management in accordance with an aspect of the present invention.

FIG. 7d is a graph of fusion data using a stream method or operation from a simulation for threat engagement management in accordance with an aspect of the present invention.

DETAILED DESCRIPTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail so as not to obscure the present invention.

Figure 1:
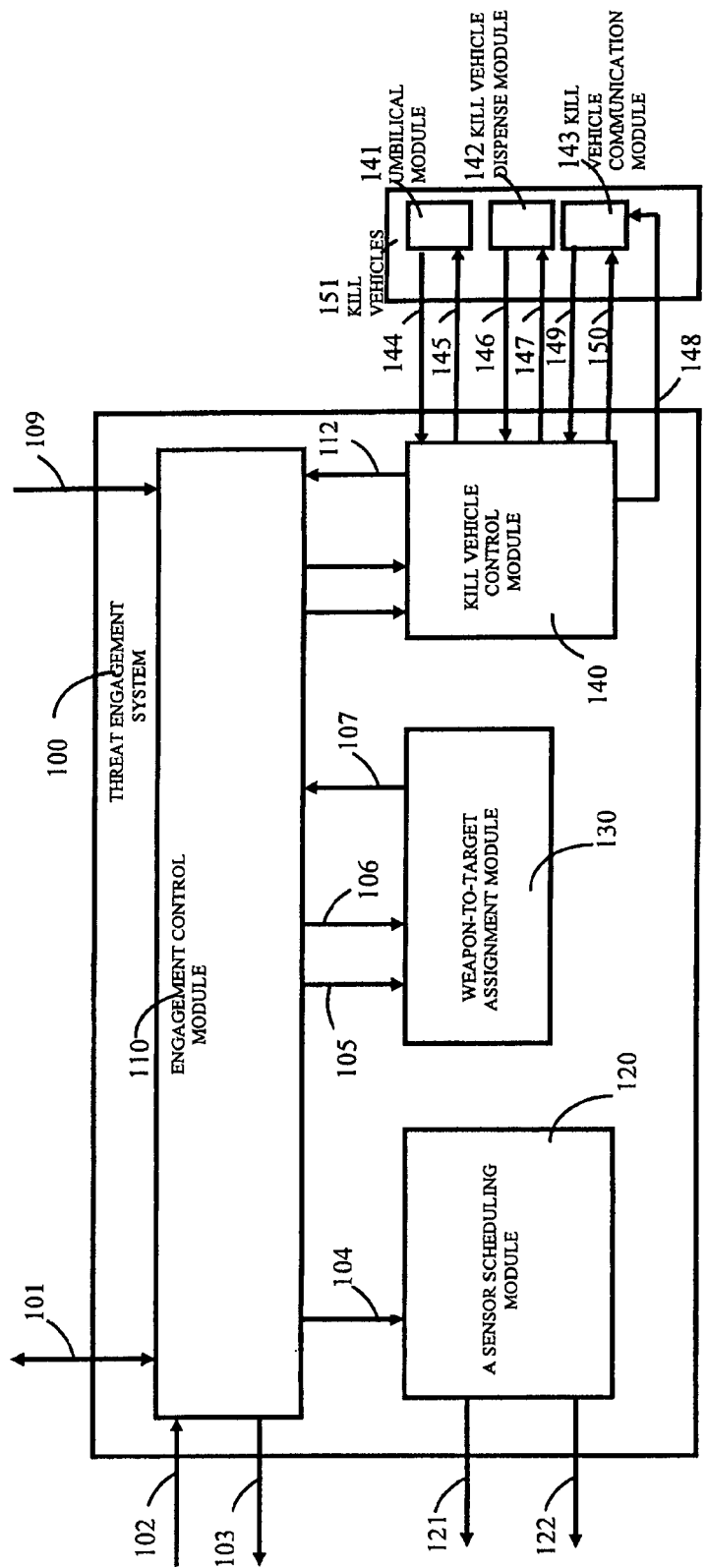
FIG. 1 is a simplified block diagram of a processing system for threat engagement management in accordance with an aspect of the present invention.

Now referring to FIG. 1, a simplified block diagram of a threat engagement system 100 is illustrated in accordance with one aspect of the present invention. As shown in FIG. 1, the threat engagement system comprises an engagement control module 110, a sensor scheduling module 120, a weapon-to-target assignment module 130, and a kill vehicle control module 140.

Engagement control module 110 may be a controller, a processor, a computer, a programmable logic controller (PLC), or another known type of control module useful for carrying out a set of instructions, steps, logic steps, and/or software programs. Engagement control module 110 is configured to provide threat engagement management for detected threats. For example, in certain embodiments the engagement control module 110 may be coupled with an unmanned carrier vehicle, such as a Predator aerial drone manufactured by General Atomics of San Diego, Calif., with a manned vehicle, such as fighter-aircraft, or with another threat engagement management platform. The platform may be located on land, sea, in the air or space, near or in an area of interest.

Engagement control module 110 is configured to provide threat engagement planning comprising plans for sending an interceptor to a detected threat based on threat data. Threat data may be information detected by a sensor (to include a human sensor) on a weapon or a weapon platform, missiles, rockets, nuclear/biological/chemical (NBC) projectiles, enemy aircraft, or human targets. Engagement control module 110 may also be configured to provide surrogate target generation, such as a secondary list of targets, or back-up targets that may be engaged based on new or changing information, such as information from at least one of the sensors 201, 202 (shown in FIG. 2). Engagement control module 110 may also be configured to provide a kill volume determination, e.g., a determination of the volume or number of targets successfully resolved by interceptors dispensed from the threat engagement management system 100. Engagement control module 110 may also be configured to provide threat lethality leakage monitoring. "Leakage" is used to describe a false negative. Threat lethality leakage occurs when a lethal target is falsely determined to not be lethal by a threat management method or system, for example, by the algorithm presented herein. Threat lethality leakage monitoring entails keeping track of possible worst-case false negatives.

Engagement control module 110 may also be configured to provide threat engagement plan execution, e.g., kill vehicle fire control to a predictive impact point (PIP), as well as a post-mortem kill assessment regarding any threats that are destroyed, are incapacitated, or that survive a particular threat engagement with an interceptor.

Sensor scheduling module 120 may also include attitude command signal 122 that provides attitude commands to a guidance, navigation, and control module ("GNC," not shown). For example, in certain embodiments when the engagement management processing system 100 is coupled with an unmanned aircraft or satellite platform, and the sensors detect that the platform needs to adjust its attitude in relation to a fixed object or reference point, attitude command signal 122 thereafter provides attitude information to the GNC so that overall position around, over, within, or near the area of interest may be maintained or achieved.

Multiple sensors (shown, for instance, in FIG. 2 as elements 201 and 202) may provide detected threat data. While two separate sensors are depicted, it is possible that a single sensor array could provide multiple sensor inputs of detected threat data. Detected threat data is fusion processed, by, for example, a lethality fusion and/or feature fusion module, such as modules 206 and 207 depicted in FIG. 2. The fusion process may provide a target track-lethality list 109 that is provided as an input to engagement control module 110. The sensors may be controlled with the sensor scheduling module 120 via sensor scheduling command signal 121 that may include an instruction to survey a threat cloud, e.g., an area of interest. By way of example and not limitation, an area of interest may be a battlefield, a security zone surrounding a naval ship, or a terrorist hideout. As used herein, "area of interest" and "threat cloud" are intended to be used synonymously.

Sensor scheduling command signal 121 may comprise an input related to a step stair pattern determination that increases the sensor(s) field of view so that the view of the area of interest is enlarged. Sensor scheduling command signal 121 may also comprise a set of instructions for sensor parameter definition. For instance, if various chemicals across a wide range of infrared detection are suspected as part of a threat cloud, the sensor(s) may be instructed to detect with varied frequencies of infrared light known to interact with the suspected chemicals in the threat cloud.

Engagement control module 110 receives the target track-lethality list 109, the carrier vehicle state signal 102 from the GNC, a weapon-to-target assignment solution signal 107 from the weapon-to-target assignment module 130, and a kill vehicle dispense mechanism health status and state signal 112 from the kill vehicle control module 140. The engagement control module 110 sends and/or has bi-directional communication with at least the GNC via signal 101 that communicates initializations, configuration status and control, and information on the health and status of the GNC and surveillance elements (such as sensors 201 and 202 shown in FIG. 2), to and from engagement control module 110. Signal 101 may also communicate threat engagement management processing system 100 health and status reports to mission management from engagement control module 110. Mission management may be a control room remotely located from the threat engagement management processing system 100, whether aboard an airborne early warning and control aircraft (AEWC) or at a ground or sea-based facility.

Engagement control module 110 may also provide a predictive impact point (PIP)/attitude signal 103 to the GNC. PIP/attitude signal 103 may comprise instructions for the GNC on the movement of a carrier vehicle. The PIP may comprise a fusion-processed data stream of features that have been extracted from threat data detected by sensors coupled to the threat engagement management processing system 100, for instance, sensors 201 and/or 202. The PIP may comprise a covariance or other aggregation/fusion of the data detected by the sensors over time. The PIP/attitude signal includes information on an expected point of impact for an interceptor once the interceptor has been launched to engage a threat.

Kill volume determination signal 104 may be provided from engagement control module 120 to the sensor scheduling module 120, and includes information on kill volumes. Signal 105 is provided from the engagement control module 110 to the weapon-to-target assignment module 130, and may comprise an engagement track list, and associated lethality data. The engagement track list is generated by engagement control module 110 based at least in part on the target track-lethality list 109 provided from surveillance sensors, for instance, sensors 201 and 202, and may also be based at least in part on any monitored targets or other measurements. The engagement track list includes information such as a prioritized list of targets with target identifiers, distance to target information, target type information, and target location. Lethality data provides a prioritized scored value for a general lethality ranking for all of the targets on the engagement track list.

The weapon-to-target assignment module 130 takes the engagement track list and the lethality data, and compares the two to available threat management resources. Threat management resources include interceptors. The weapon-to-target assignment module 130 is configured to run a continuous comparison loop between available interceptors and the engagement track list, at least until all interceptors have been dispensed.

The weapon-to-target assignment module 130 is configured to generate a weapon-to-target assignment solution, i.e., the results of the comparison between the engagement track list/lethality data and the available threat management resources. The engagement control module 130 is further configured to provide a dispense/configuration command signal 108 to the kill vehicle control module 140. The dispense/configuration command signal 108 is an instruction signal that provides key parameters to the kill vehicle control module 140 for when to release kill vehicles, or other interceptors, and to what target. The dispense/configuration command signal 108 also provides communication from engagement control module 110 to the kill vehicle control module 140. PIP/download data signal 111 provides predictive impact point information from engagement control module 110 to kill vehicle control module 140, or the estimated point of impact for particular kill vehicles once the kill vehicle has been given a target and dispensed.

Kill vehicle control module 140 may be coupled to all of the available threat management resources comprising kill vehicles 151 and/or other interceptors, and may monitor the kill vehicles' health and status via health status signal 144. Such monitoring may include requests for self-tests to be performed by the kill vehicles 151, and evaluation of the results of such self-tests. While the simplified block diagram that is FIG. 1 illustrates kill vehicles 151 as a single block, it is to be understood that kill vehicles 151 may comprise any number of deliverable weapons and of diverse natures. For instance, kill vehicles 151 may comprise air-to-air missiles, air-to-ground missiles, surface-to-air missiles, and/or motorized conventional arms, including without limitation motorized machine guns, motorized mortars, and/or motorized grenade launchers. The kill vehicles 151 may be at least initially coupled to the kill vehicle control module 140 with an umbilical module 141. The umbilical module 141 allows for health status monitoring of each kill vehicle and for data download to the kill vehicle from the kill vehicle control module 140. Data downloads may comprise target assignments, attitude information, PIP information, kill vehicle configuration information, and/or other information.

Kill vehicle dispense module 142 receives information on when to release a particular kill vehicle from kill vehicle control module 140. As used herein, dispense is synonymous with release. Broadly, dispense is the mechanics of releasing an individual kill vehicle with instructions for the kill vehicle to proceed to a predicted impact point, i.e., to a target included in the engagement track list. The kill vehicle dispense module 142 may provide data on the health of the dispense module to the kill vehicle control module 140, as shown by the health status signal 146.

While the kill vehicle umbilical module 141 is maintained prior to dispensing an individual kill vehicle, once an individual kill vehicle is dispensed, the kill vehicle maintains communication with the kill vehicle control module 140 via kill vehicle communication module 143. PIP data may be communicated to the kill vehicle using the kill vehicle communication module 143 via communication signal 150. Such communication is typically wireless and may comprise coded wireless communication as one of skill in the art would comprehend. The kill vehicle communication module 143 may be instructed to perform a self-test or other health status check, and to communicate that result to the kill vehicle control module 140 via health status signal 149. Kill vehicles may receive configuration data and information from the kill vehicle control module 140 via configuration signal 148. Configuration information may comprise missile fin position information, speed-to-target information, or other information on how the kill vehicle is to configure any adjustable or variable component. Kill vehicle control module 140 is configured to provide a kill vehicle dispense/mechanics/health status and state signal to engagement control module 110 to provide the engagement control module 110 with, for instance, information on any remaining kill vehicles, whether an existing kill vehicle properly dispensed, and/or the health and status of the kill vehicles 151.

Figure 2:
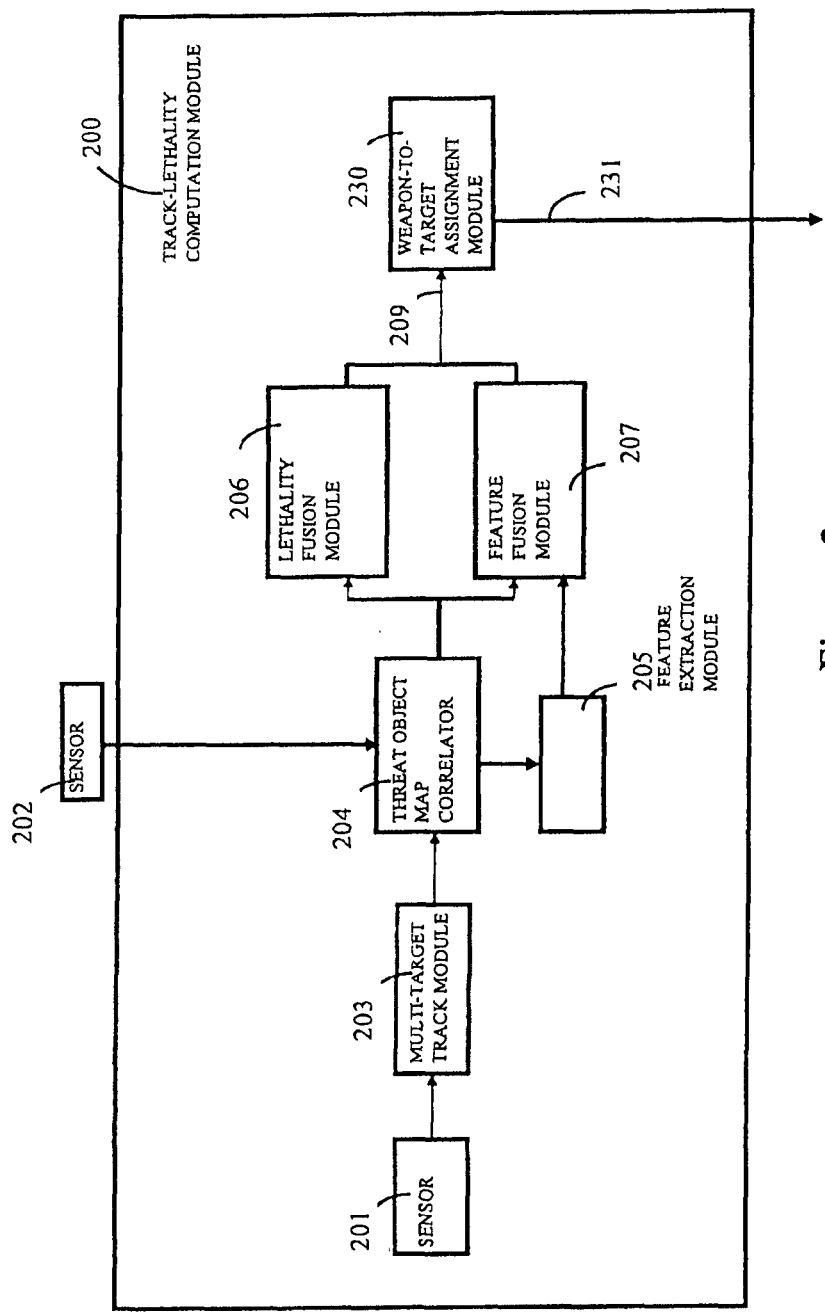
FIG. 2 is a block diagram of a track-lethality computation implemented by a processing system for threat engagement management in accordance with an aspect of the present invention.

FIG. 2 is a block diagram of a track-lethality computation module 200 implemented by a processing system for threat engagement management in accordance with an aspect of the present invention. As shown in FIG. 2, track-lethality computation module 200 comprises inputs from at least two sensors 201 and 202. While sensor 202 is shown as being external to track-lethality computation module 200, and sensor 201 is shown as being internal to track-lethality computation module 200, it is to be understood that both or either of the sensors may be external or internal. Further, while two sensors are shown for ease of description, it is to be understood that any plurality of sensors could be implemented. Additionally, sensors 201 and/or 202 may include human input, such as a forward air controller, special forces, or other operative that provides a laser that points to a known target, or that otherwise provides surveillance or intelligence that may add to or substitute for data detected by the sensors 201 and/or 202.

Sensors 201 and 202 may be infrared sensors, radio frequency sensors, radar sensors, laser sensors, or other types of sensors capable of sensing threat characteristics. For example, sensor 201 may be an infrared sensor that is capable of sending an infrared signal to a threat cloud and/or area of interest that receives reflected infrared light back from a target object where some of the reflected light has had particular frequencies of light absorbed by the target object. Given this information, the sensor may be able to categorize the type of target object and/or to track the target object as it moves. For instance, in situations where the target object may be a missile, the infrared sensor 201 may track missile within the area of interest, and may then provide tracking measurements to a multi-target track module 203.

Multi-target track module 203 may receive the measurements from sensor 201 and tracks the data by individual target. For instance, there may be multiple missiles that are seen to be threats as measured by the sensor 201. Multi-target track module 203 provides the tracked threat data to a threat object map (TOM) correlator 204. Sensor 202 also provides the results of its measurements to TOM correlator 204. Sensor 202 may be a radar sensor, such as a command, control, battle management, and communications (C2BMC) sensor. Thus, each of sensors 201 and 202 provide their detected threat data to the TOM correlator 204. TOM correlator 204 may be configured to provide a measure of the correlation between at least two sensors, for instance sensors 201 and 202.

The TOM correlator 204 may also be configured to correlate the detected data from each of sensors 201 and 202 to create a marginal assignment probability (MAP) matrix. The MAP matrix may confirm each sensor's data through correlation based upon a probabilistic framework. For instance, data from sensor 201 about a first threat target may be confirmed by similar data from sensor 202 about the first threat target. Sometimes, however, the data from one sensor may not match the data from the other sensor. For instance, sensor 201 may provide data that indicates a total of six targets, while sensor 202 may provide data that indicates a total of five targets. The TOM correlator 204 provides the MAP matrix to all of feature extraction module 205, feature fusion module 207, and lethality fusion module 206.

Feature extraction module 205 may receive the correlated MAP matrix data and, from that data, extract certain features. "Feature" data generally includes certain features that are known to represent, or likely represent, valid targets. For instance, feature data may include a known or suspected chemical detection as measured and reported by infrared sensor 201. Feature data may also include other surveillance information, such as information from a human operative, as described above. Feature data may include dimensional or geographic data that is known to represent, or likely represents, valid targets. Feature data may include detection of radio frequency signals that represent the threat of a known missile that uses those radio frequency signals to locate and/or track its progress from launch to target.

The extracted feature data may be provided to feature fusion module 207. An input that also may be provided to feature fusion module 207 is the MAP matrix from the TOM correlator 204. The MAP matrix is also provided to lethality fusion module 206. In certain embodiments, the MAP matrix may be provided with a correlation score above which the lethality fusion module 206 may be used exclusively (or with a weighted average over the feature fusion module 207) for providing a track-lethality signal 209 to the weapon-to-target assignment module 230. In certain embodiments, the MAP matrix may be provided with a correlation score, below which the lethality fusion module 206 may be used in conjunction with the lethality fusion module 206 for providing a target track-lethality signal 209 to the weapon-to-target assignment module 230. The weapon-to-target assignment module 230 provides specific assignments and instructions to individual kill vehicles via kill vehicle assignment signal 231.

The target track-lethality list 109/209 may track the locations of all the detected threats in comparison to non-threat objects, such as chaff or decoys. For example, the target track-lethality 109/209 list may comprise information on target location, distance to target, and type of target, in combination with a lethality score that refers to a measure of confidence that the object of interest is an actual threat. An example of a high lethality score might be a nuclear missile that has launched, as either detected by human intelligence or by prior knowledge of a nuclear missile location in combination with infrared sensor 201 detecting a launch. An example of a lower lethality score would be a decoy missile, or an airburst of metal-foil and/or metal-impregnated fiberglass strips, that is, "chaff."

Once the target track-lethality list 109/209 or the engagement track list 105 has been provided to the weapon-to-target assignment module 130 (as described above), the weapon-to-target assignment module 130/230 compares the list data to available threat management resources, and then provides kill vehicle assignments to available kill vehicles based upon the comparison via kill vehicle assignment signal 231.

According to one aspect of the disclosure in FIG. 1, a target track-lethality list 109 is shown as being provided to the engagement control module 110, and signal 105 is described as providing an engagement track list 105 to the weapon-to-target assignment module 130. According to one aspect of the disclosure, FIG. 2 is described herein as providing the target track-lethality list 209 directly to the weapon-to-target assignment module 230. In this regard, in various embodiments the weapon-to-target assignment module 130/230 may be located internally or externally to engagement control module 110. The engagement control module 110, as described above, includes a processor or a processor-like component for carrying out steps or instructions, for example, software instructions. In various embodiments, the weapon-to-target assignment module 130/230 may comprise a processor that is separate from the processor of the engagement control module 110, and thus may receive the track-lethality list 209 directly from at least one of the lethality fusion module 206 and the feature fusion module 207. In various embodiments, the target-lethality list 109 may be provided to the engagement control module 110 for processing into a target engagement list 105 prior to being provided to the weapon-to-target assignment module 130/230.

Lethality fusion module 207 is configured to receive multiple MAP matrices from different points in time. As such, lethality fusion module 207 may comprise an accumulator or a memory for storing received multiple MAP matrixes. A newly received MAP matrix may be combined using a multiplier, combiner, or other integrating component, so that a running combination of all received MAP matrixes is provided as a lethality output. As noted above, if the received MAP matrix data matches sufficient indicators to score above a predetermined level, in certain embodiments the output of the lethality fusion module 207 may be used expressly as the track-lethality list 209 input to the weapon-to-target assignment module 130/230. In other embodiments, if the scored correlation of the received MAP matrix data is below a certain predetermined level, the outputs of both the feature fusion module 207 and the lethality fusion module 206 may be combined to create the target track-lethality list 109/209.

Figure 3:
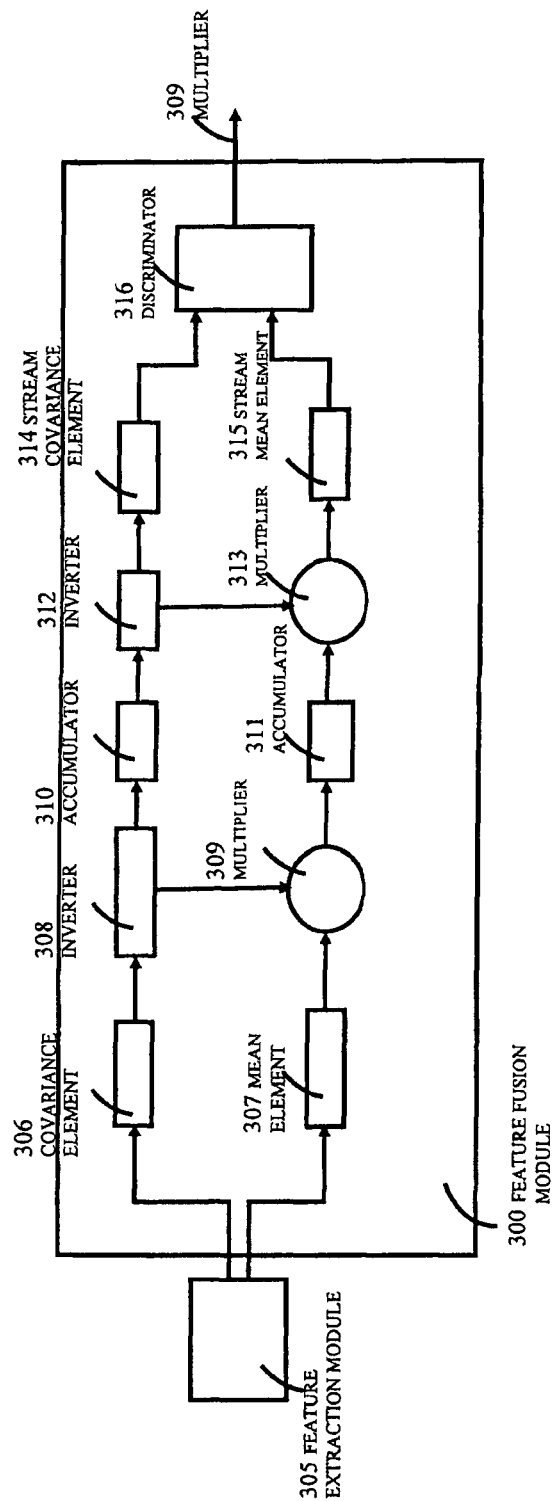
FIG. 3 is a block diagram of a time-dependent data fusion computation implemented by a processing system for threat engagement management in accordance with an aspect of the present invention.

FIG. 3 is a block diagram of a time-dependent data fusion computation implemented by a processing system for threat engagement management in accordance with an aspect of the present invention. FIG. 3 illustrates feature fusion module 300. Feature fusion module 300 may comprise a covariance element 306, a mean element 307, an inverter 308, a multiplier 309, an accumulator 310, an accumulator 311, and inverter 312, a multiplier 313, a stream covariance element 314, a stream mean element 315, and a discriminator 316. In certain embodiments, prior to reaching the feature fusion module 300, features that match known or expected threats, or features that are similar to known or expected threats, are extracted by feature extraction module 205/305. In certain embodiments, feature extraction module 205/305 is a component within the feature fusion module 300, and after reaching the feature fusion module 300, features that match known or expected threats, or features that are similar to known or expected threats, are extracted.

Extracted features can be provided to both of the covariance element 306 and the mean element 307, where the received features are processed statistically to calculate the covariance and the mean from the received features, respectively. After the covariance element 306 and the mean element 307, the respectively processed signals are provided to an inverter and a multiplier, respectively. At the inverter, the inverter inverts the covariant signal and sends the inverted covariant signal to both multiplier 309 and accumulator 310. At accumulator 310, the inverted covariant is stored with all of the detected inverted covariant extracted features from multiple time points.

As additional features are received and processed, they may also be stored at accumulator 310, which provides an output to inverted 312. Inverted 312 inverts the covariant feature data and provides its output to both multiplier 313 and stream covariance element 314. Stream covariance element 314 aggregates the received twice-inverted covariant feature data on a running basis, so that newly received covariant feature data is aggregated or data fused. Aggregation or data fusion may be accomplished with simple logic, for example, by adding all of the covariant feature data and then dividing the sum total by n, where n is the number of time points representing received feature data. Aggregation or data fusion may also be accomplished using a Probabilistic Argumentation System (PAS), as described herein. The data fused stream covariance is then provided to discriminator 316. The data fused stream covariance has a smaller noise covariance than would the independent and identically distributed noise that would otherwise be found within sensor data.

According to one aspect, the extracted feature data is also provided from feature extraction module 205/305 to mean element 307. At mean element 307, the received feature data is statistically processed to produce a mean, or average of the feature data. The mean is then provided to multiplier 309. Multiplier 309 multiplies the inverted covariant received from inverter 308 with the mean provided from mean element 307. The output of multiplier 309 is then provided to accumulator 311 that stores multiple time points of statistically processed feature data. The output of accumulator 313 is provided to multiplier 313. Multiplier 313 multiplies the output of accumulator 311 with an output of inverter 312. Multiplier 313 then provides an output to stream mean element 315. Stream mean element 315 aggregates, or data fuses, the processed mean feature data on a running basis so that newly received mean feature data is incorporate with all of the previously received mean feature data. The stream mean feature data is then provided to discriminator 316.

In certain embodiments, discriminator 316 receives as inputs both the stream feature covariance and stream feature mean data and compares these sets of data to known physics models. The known physics models may comprise data on how a known or suspected target behaves and/or performs, or what the same may emit or otherwise provide as a signature unique to that threat or class of threats. The known physics models may comprise data on how a known or suspected decoy behaves and/or performs, or what the same might emit or otherwise provide as a signature unique to that threat or class of threats. The known physics models may also comprise data on what "noise" looks like. In certain embodiments, discriminator 316 weighs comparisons of the stream feature mean and the stream feature covariance to the known physics models to create the track-lethality list 109/209.

Figure 4:
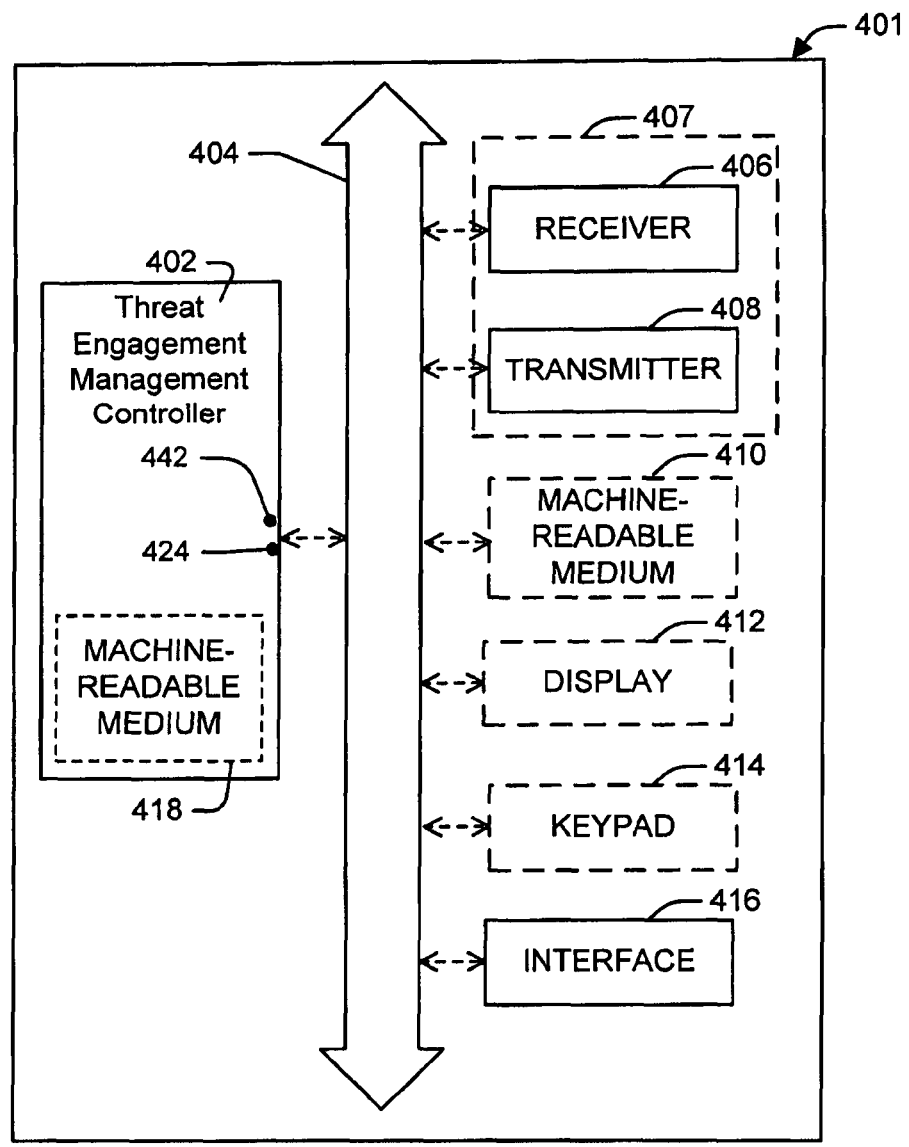
FIG. 4 is a conceptual block diagram illustrating an example of a processing system for threat engagement management in accordance with an aspect of the present invention.

FIG. 4 is a conceptual block diagram illustrating an example of a processing system 401 for threat engagement management in accordance with an aspect of the present invention. As shown in FIG. 4, the processing system 401 comprises a threat management controller 402, a machine-readable medium 418, a communications bus 404, a communication module 407 comprising a receiver 406 and a transmitter 408, a machine-readable medium 410, a display 412, a keyboard 414, and an interface 416.

The threat engagement management controller 402 is capable of communication with receiver 406 and transmitter 408 through bus 404, or other structures or devices. It should be understood that communication means other than buses can be utilized with the disclosed configurations. The threat engagement management controller 402 may generate audio, video, multimedia, and/or other types of data to be provided to the transmitter 408 for communication. In addition, audio, video, multimedia, and/or other types of data can be received at the receiver 406, and processed by the threat engagement management controller 402.

The threat engagement management controller 402 may include a general-purpose processor or a specific-purpose processor for executing instructions and may further include volatile or non-volatile memory for storing data and instructions for software programs. The instructions, which may be stored in machine-readable medium 410 and/or 418, may be executed by the threat engagement management controller 402 to control and manage access to the various networks, as well as provide other communication and processing functions. The instructions may also include instructions executed by the threat engagement management controller 402 for various user interface devices, such as display 412 and keypad 414. The threat engagement management controller 402 may include an input port 422 and an output port 424. Each of the input port 422 and the output port 424 may include one or more ports. The input port 422 and the output port 424 may be the same port (e.g., a bi-directional port) or may be different ports.

The threat engagement management controller 402 may be implemented using software, hardware, or a combination of both. By way of example, the threat engagement management controller 402 may be implemented with one or more processors. A processor may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information. The threat engagement management controller 402 may also include one or more machine-readable media (e.g., 418) for storing software. A machine-readable medium can be one or more machine-readable media. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media (e.g., 418) may include storage integrated into a processor, such as might be the case with an ASIC. Machine-readable media (e.g., 410) may also include storage external to a processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for the threat engagement management controller 402. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by a threat engagement management controller 402, or a processing system 401. Instructions can be, for example, a computer program including code.

Interface 416 may be any type of interface and may reside between any of the components shown in FIG. 4. Interface 416 may also be, for example, an interface to the outside world (e.g., an Internet network interface). Transceiver block 407 may represent one or more transceivers, and each transceiver may include a receiver 406 and a transmitter 408. Functionality implemented in threat engagement management controller 402 (for example, threat management engagement controller 110, sensor scheduling module 120, weapon-to-target assignment module 130, and kill vehicle control module 140) may be implemented in a portion of machine-readable medium 418, a portion of receiver 406, a portion of a transmitter 408, a portion of a machine-readable medium 410, a portion of a display 412, a portion of a keypad 414, and/or a portion of an interface 416.

Figure 5:
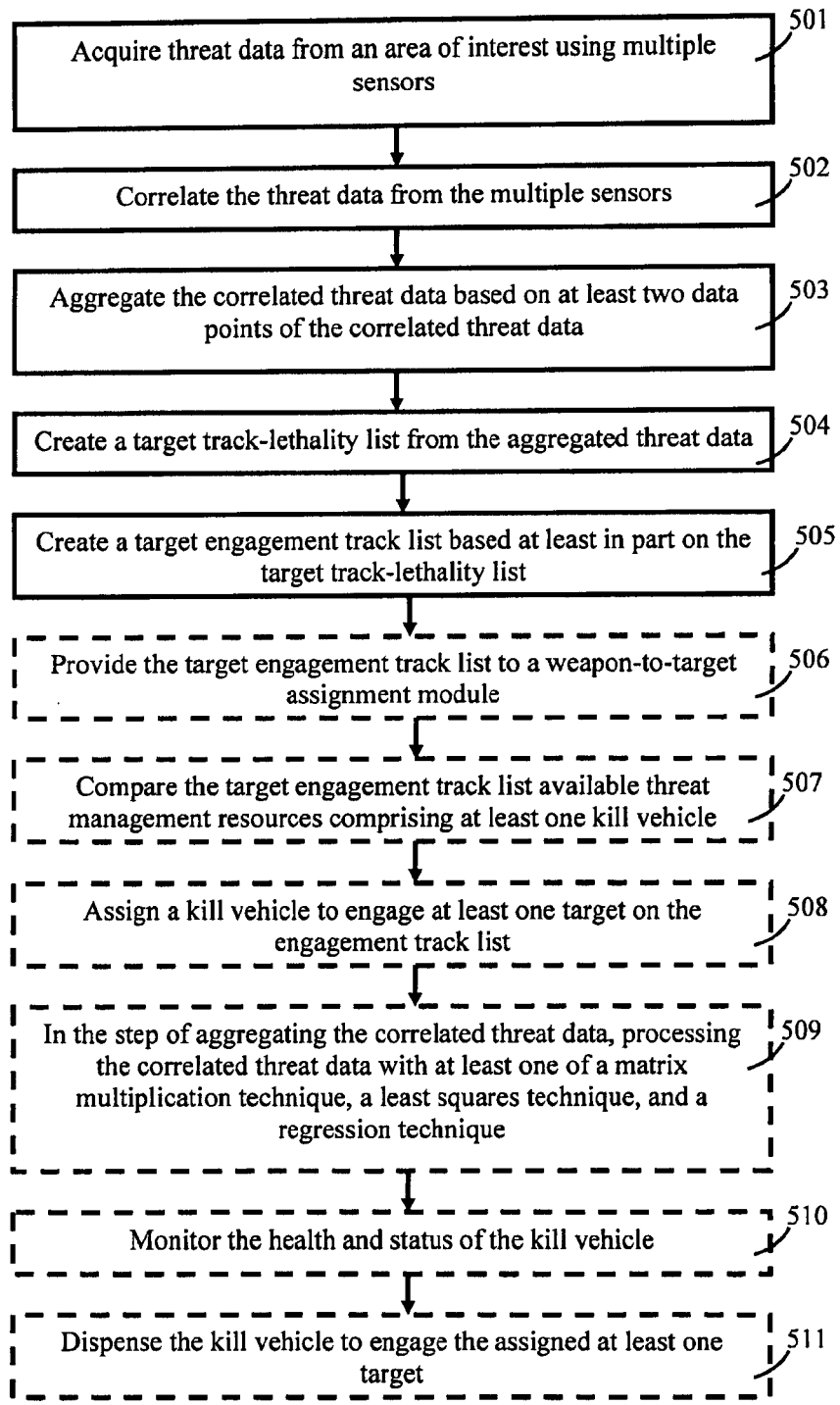
FIG. 5 is a simplified flow diagram illustrating a method or operations for threat engagement management in accordance with an aspect of the present invention.

FIG. 5 is a simplified flow diagram illustrating a method or operation for threat engagement management in accordance with an aspect of the present invention. At method or operation 501, threat data is acquired from an area of interest using multiple sensors, for instance, sensors 201 and 202 shown in FIG. 2. At method or operation 502, the threat data from the multiple sensors is correlated. At method or operation 503, the correlated threat data is aggregated, for instance using the algorithm that is disclosed below with at least one of a lethality fusion method and/or a feature fusion method, and/or by using other techniques, for example, logic techniques.

At method or operation 504, a target track-lethality list is created from the aggregated threat data. At method or operation 505, a target engagement track list is created based at least in part on the target track-lethality list. At method or operation 506, the target engagement track list is provided to a weapon-to-target assignment module. At method or operation 507, the target engagement track list is compared to available threat management resources comprising at least one kill vehicle.

At method or operation 508, a kill vehicle is assigned to engage at least one target on the engagement track list. At method or operation 509, and in the step of aggregating the correlated data, the correlated threat data is processed with at least one of a multiplication technique, a least squares technique, and a regression technique. At method or in operation 510, the health and status of the kill vehicle(s) is monitored. At method or operation 511, a kill vehicle is dispensed to engage at the assigned at least one target from the engagement track list.

FIGS. 6*a-c* and 7*a-d* illustrate examples of implementation of certain embodiments of the invention where the fusion of time dependent data is optimized. The general approach illustrated in FIGS. 6*a-c* and 7*a-d* is built on a Probabilistic Argumentation System framework.

According to one aspect of the disclosure, one purpose of multi-sensor data fusion is to correctly combine information in the presence of imprecise, uncertain, and even incorrect data. Usually, data taken from subsequent time instants is presupposed to be independent and identically distributed (IID). However, in some applications, data (e.g., a data stream) varies as a function of time (e.g., data that is time dependent). Examples include an attack aircraft releasing a missile with an automatic guidance system to engage a target. Measurements are taken as the missile approaches the target, and the signal-to-noise ratio (SNR) and the spatial resolution of the measurements increase as a function of time. In another example, a missile defense kill vehicle is tasked to destroy a warhead. The kill vehicle collects measurements as it approaches the warhead. Again, the measurements tend to improve monotonically as a function of time. In these examples, the data contains aspects of time dependency. The data is usually modeled to have both a true signal and random noise. Examples of random noise include thermal noise, fading noise, model error, etc. A true signal may be a constant value, e.g., a measure of an object's constant velocity. For both the true signal and noise components, measurements collected at the present time contain redundant information when compared to previous measurements. In certain embodiments of the invention, knowledge of this redundancy is utilized in the data fusion process, allowing decisions about target identity to be computed in less time.

Consider a set of features for an object being estimated as a function of time. The underlying task is to aggregate these features and infer the object's identity from the aggregated features. One approach to reach such an inference is described below according to one aspect of the disclosure.

Let $f=[f_1(j) \ldots f_N(j)]^T$ be a set of N features calculated using noisy data at time j. These features are samples from a distribution $f^*[f_1^*(j) \ldots f_N^*(j)]^T$ around the actual feature values at time j. Assume f* has a joint normal distribution, with mean $\mu^j=[\mu_1^j \ldots \mu_N^j]^T$, and covariance matrix $\Sigma_j$. Then the entire information about f* up to time j is given by $\mu X f^* + \epsilon$, where $\mu=[\mu^0 \ldots \mu^j]^T$, $X=[I \ldots I]^T$, $\epsilon=[\epsilon^0 \ldots \epsilon_j]^T$, and $$\Omega = \text{cov}(\varepsilon) = \begin{bmatrix} \Sigma_0 & 0 & \cdot & \cdot & 0 \\ 0 & \Sigma_1 & & & \cdot \\ \cdot & & \cdot & & \cdot \\ \cdot & & & \cdot & 0 \\ 0 & \cdot & \cdot & 0 & \Sigma_j \end{bmatrix}.$$

Definition 1. The instant distribution at time k about f* is given as $f^* \approx N(\mu^k, \Sigma_k)$.

Definition 2. The stream information at time k about f* is defined as all previous information about f* at time j=0, 1, ..., k. The stream distribution is given as $f^* \approx N(M_k, C_k)$ where $$C_k = \left( \sum_{j=0}^{k} \sum_{j}^{-1} \right)^{-1},$$

and $M_k = C_k X^T \Omega^{-1} \mu$.

The information available about f* can be combined using the following two theorems.

Theorem 1. Let $H_1 = (\Re^N, \mu_1, \Sigma_1, id, \Re^N)$, and $H_2 = (\Re^N, \mu_2, \Sigma_2, id, \Re^N)$ be two Gaussian hints on $\Re^N$, where id: $\Re^N \to 2 \Re^N$. Then $H \oplus H_2 = (\Re^N, \mu, \Sigma, id, \Re^N)$, where $(\mu, \Sigma)$ represent the probability measure $N(\mu, \Sigma)$ on the first $\Re^N$.

Theorem 2. $H^{\to k} = (\Re^N, \mu^{\to k}, id, \Re^N) = H_0 \oplus \ldots \oplus H_k$, where $$\mu^{\to k} = \sum_{j=0}^{\to k} \sum_{j}^{k} \left( \sum_{j}^{-1}, \mu^j \right), \text{ and } \sum^{\to k} = \sum_{j=0}^{k} \left( \sum_{j}^{-1} \right)^{-1}.$$

Optimality of the above was considered in view of the stream approach exhibiting several unique properties:

1) Precision of the stream approach is strictly increasing as time proceeds; and
2) Stream fiducial density is derived from the classical Aitken estimator, which is known to produce optimal result with least variance and linear unbiased estimate.

The main limitation of the above approach is that the feature to be estimated is assumed to be constant over time. This is more restrictive than it is in practice because certain techniques can mitigate this limitation by trading off convergence rates. For example, one could consider a sliding window technique with the assumption of constant feature.

To illustrate an aspect of the subject technology, the approach described above was implemented in the MATLAB numerical computing environment and programming language, and evaluated using simulated data and experimental data. In the simulation, two object types were created and one was designated to be the target and the other was designated as a decoy. Sensor data for these objects was modeled using two linear functions, $g_1(t)$ and $g_2(t)$. Gaussian noise was added to these signals with a square-law dependence on time, i.e. $\sigma_n^2(t) = (2 - 1.4t)^2$ where $\sigma_n^2$ the noise variance, and t is time. Two functions, $f_1(t) = g_1(t) + 0.18t - 20 = 80$ and $f_2(t) = (g_1(t) + g_2(t))/2 = 100$, were created to represent features for these objects. Without noise, these features would be time-invariant.

The simulation involved 100 time points. The sensor data were fed into a PAS fusion engine which implemented the stream approach. Probability of correctly identifying the target $P_{Discrim}$ was used as measure of effectiveness. More specifically, $P_{Discrim}$ was computed for both stream and instant methods. Results are shown in FIGS. 6a-c.

FIG. 6a illustrates the features associated with each object as a function of time. FIGS. 6b and 6c illustrate $P_{Discrim}$ versus time, where FIG. 6b shows results of the instant method and FIG. 6c shows results of the stream method. In comparing the two, it is evident that the stream method stabilizes significantly sooner than the instant method.

The setup for the experiment illustrated by FIGS. 6a-c and 7a-d utilized hardware components including a visible camera and projector. The projector projected five objects created using scene generation tools. Measurements from the camera were made for 20 seconds resulting in a total of 300 time samples. Five objects were spatially segmented from the measurements and the average intensity from each object was extracted. Noise was additionally added to lower the SNR. The noise variance followed the equation, $$\sigma_n^2(t) = \left( \frac{1}{3} - \frac{1}{4} t \right)^2.$$

The variance was chosen so that the SNR would begin with a value of 5 and end with 20.

Simulated noise variance was chosen to be much greater than the apparent sensor noise and to have no zero-noise floor. The features were passed to the PAS fusion engine. The simulation was repeated 100 times and statistics were taken of the results. Each of the projected objects represented a unique type, which we labeled target and non-target. FIGS. 7a and 7b illustrate the original signals and features of five objects, respectively. FIGS. 7c and 7d illustrate $P_{Discrim}$ versus time for the instant and stream approaches, respectively. It is seen that stream $P_{Discrim}$ converged to an actionable decision significantly faster than the instant $P_{Discrim}$.

In both simulations illustrated by FIGS. 6a-c and 7a-d, it is clear that the target was correctly discerned in both the instant and stream models. However, the stream model converged at a higher rate and was significantly smoother compared to the instant model. In the hardware component experiment, the separation of the target from the other object types was greater with the stream model.

The description of the subject technology is provided to enable any person skilled in the art to practice the various configurations described herein. While the subject technology has been particularly described with reference to the various figures and configurations, it should be understood that these are for illustration purposes only and should not be taken as limiting the scope of the invention.

There may be many other ways to implement the subject technology. Various functions and elements described herein may be partitioned differently from those shown without departing from the spirit and scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the spirit and scope of the subject technology.

The term "processing system" may refer to one or more processing systems, one or more processors, and/or one or more components thereof. For example, a processing system may refer to element 401 or 402 in FIG. 4. A processing system may be an integrated circuit or a computer system.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the invention, and are not referred to in connection with the interpretation of the description of the invention. All structural and functional equivalents to the elements of the various configurations described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method for target engagement management, comprising:
    acquiring, via a processor-based system, threat data at different points in time from an area of interest with multiple sensors;
    correlating the threat data from the multiple sensors;
    aggregating the correlated threat data based on at least two data points of the correlated threat data acquired at different points in time;
    creating a target track-lethality list from the aggregated threat data; and
    creating a target engagement track list based at least in part on the target track-lethality list.

2. The method of claim 1, further comprising:
    providing the target engagement track list to a weapon-to-target assignment module;
    comparing the target engagement track list to assignable threat management resources, the threat management resources referencing at least one interceptor; and
    assigning an interceptor to engage at least one target on the target engagement track list.

3. The method of claim 2, further comprising:
    monitoring the interceptor's health and status; and
    dispensing the interceptor to engage the at least one target.

4. The method of claim 1, wherein the aggregating the correlated threat data comprises processing the correlated threat data with at least one of a feature fusion module and a lethality fusion module.

5. The method of claim 1, wherein the correlated threat data comprises at least one of a correlated threat object map, and a correlated set of feature data.

6. The method of claim 1, wherein the aggregating the correlated threat data comprises processing the correlated threat data with at least one of the following: a matrix multiplication technique, a least squares technique, and a regression technique.

7. The method of claim 1, further comprising:
    extracting feature data from the threat data.

8. A non-transitory machine-readable medium encoded with instructions for target engagement management, the instructions executable by one or more processors to facilitate performing a method, the method comprising:
    acquiring threat data at different points in time from an area of interest with multiple sensors;
    correlating the threat data from the multiple sensors;
    aggregating the correlated threat data based on at least two data points of the correlated threat data obtained at different points in time;
    creating a target track-lethality list from the aggregated threat data; and
    creating a target engagement track list based at least in part on the target track-lethality list.

9. The non-transitory machine-readable medium of claim 8, wherein the method further comprises:
    providing the target engagement track list to a weapon-to-target assignment module;
    comparing the target engagement track list to assignable threat management resources, the threat management resources referencing at least one interceptor; and
    assigning an interceptor to engage at least one target on the target engagement track list.

10. The non-transitory machine-readable medium of claim 9, wherein the method further comprises:
    monitoring the interceptor's health and status; and
    dispensing the interceptor to engage the at least one target.

11. The non-transitory machine-readable medium of claim 8, wherein the aggregating the correlated threat data comprises processing the correlated threat data with at least one of a feature fusion module and a lethality fusion module.

12. The non-transitory machine-readable medium of claim 8, wherein the correlated threat data comprises at least one of a correlated threat object map, and a correlated set of feature data.

13. The non-transitory machine-readable medium of claim 8, wherein the aggregating the correlated threat data comprises code for processing the correlated threat data with at least one of the following: a matrix multiplication technique, a least squares technique, and a regression technique.

14. The non-transitory machine-readable medium of claim 8, wherein the method further comprises extracting feature data from the threat data.

15. A processing system for target engagement management, comprising:
    a threat data acquisition module configured to acquire threat data at different points in time from an area of interest with multiple sensors;
    a correlator configured to correlate the threat data from the multiple sensors;
    an aggregation module configured to aggregate the correlated threat data based on at least two data points of the correlated threat data obtained at different points in time; and
    a controller configured to create a target track-lethality list from the aggregated threat data, and to create a target engagement track list based at least in part on the target track-lethality list.

16. The processing system of claim 15, further comprising:
    a weapon-to-target assignment module configured to receive the target engagement track list, to compare the target engagement track list to assignable threat management resources, the threat management resources referencing at least one interceptor; and to assign an interceptor to engage at least one target on the target engagement track list.

17. The processing system of claim 16, wherein the weapon-to-target assignment module is configured to monitor the interceptor's health and status, and to dispense the interceptor to engage the at least one target.

18. The processing system of claim 15, wherein the aggregation module comprises at least one of a feature fusion module and a lethality fusion module.

19. The processing system of claim 15, wherein the correlated threat data comprises at least one of a correlated threat object map, and a correlated set of feature data.

20. The processing system of claim 15, wherein the aggregation module is configured to process the correlated threat data with at least one of the following: a matrix multiplication technique, a least squares technique, and a regression technique.

21. The processing system of claim 15, wherein the controller is configured to extract feature data from the threat data.

22. A computer system for target engagement management comprising:
- a processing system, the processor system comprising:
  - a threat data acquisition module configured to acquire threat data at different points in time from an area of interest with multiple sensors;
  - a correlator configured to correlate the threat data from the multiple sensors;
  - an aggregation module configured to aggregate the correlated threat data based on at least two data points of the correlated threat data obtained at different points in time; and
  - a controller configured to create a target track-lethality list from the aggregated threat data, and to create a target engagement track list based at least in part on the target track-lethality list;
- a display;
- a keyboard;
- an interface;
- a bus; and
- a machine-readable medium.

* * * * *